United States Patent
Sperry et al.

[11] Patent Number: 6,065,636
[45] Date of Patent: May 23, 2000

[54] CONVECTIVE WARMER FOR FOAM PACKAGING BAGS

[75] Inventors: Laurence Burst Sperry, Boston, Mass.; Lawrence John Pillote, Southbury; Vincent James Cavalier, Jr., Monroe, both of Conn.; Jesse Scott Drake, Maynard, Mass.; John Joseph Corrigan, III, Washington; George Teofilius Bertram, Newtown, both of Conn.

[73] Assignee: Sealed Air Corporation, Danbury, Conn.

[21] Appl. No.: 09/039,090

[22] Filed: Mar. 13, 1998

[51] Int. Cl.⁷ .................................................. B65G 59/00
[52] U.S. Cl. .................. 221/92; 221/150 A; 221/150 R; 221/153
[58] Field of Search ................................. 221/92, 90, 98, 221/101, 144, 150 A, 150 R, 152, 153, 1, 2, 3, 4, 5

[56] References Cited

U.S. PATENT DOCUMENTS

| | | | |
|---|---|---|---|
| 2,397,403 | 3/1946 | Bishop | 221/150 R |
| 2,880,904 | 4/1959 | Linthicum | 221/133 X |
| 3,710,978 | 1/1973 | Cosby | 221/150 A |
| 4,738,114 | 4/1988 | Mullen | |
| 5,813,569 | 9/1998 | Cihanek | 221/150 R |
| 5,829,631 | 11/1998 | Kasper | 221/198 X |

FOREIGN PATENT DOCUMENTS

| | | |
|---|---|---|
| 88/09907 A1 | 12/1988 | European Pat. Off. . |
| 3826011 A1 | 2/1990 | Germany . |

Primary Examiner—William E. Terrell
Assistant Examiner—Gene O. Crawford
Attorney, Agent, or Firm—Alston & Bird LLP

[57] ABSTRACT

A convective warmer for flexible plastic bags containing foam precursor chemicals includes an outer housing and an inner enclosure supported within the housing, the inner enclosure having foraminous floor and ceiling plates and foraminous dividers which divide the inner enclosure into vertical compartments for containing vertical stacks of bags. An air space exists between the housing and the inner enclosure, and a forced-air heater is arranged to heat air within the air space and circulate the heated air from the air space, through the foraminous floor plate into the compartments, and out the foraminous ceiling plate back into the air space. A loading door provides access to upper portions of the compartments for loading bags into the warmer, and a dispensing door provides access to lower portions of the compartments for removing a bottommost bag from a stack of bags in the warmer.

24 Claims, 2 Drawing Sheets

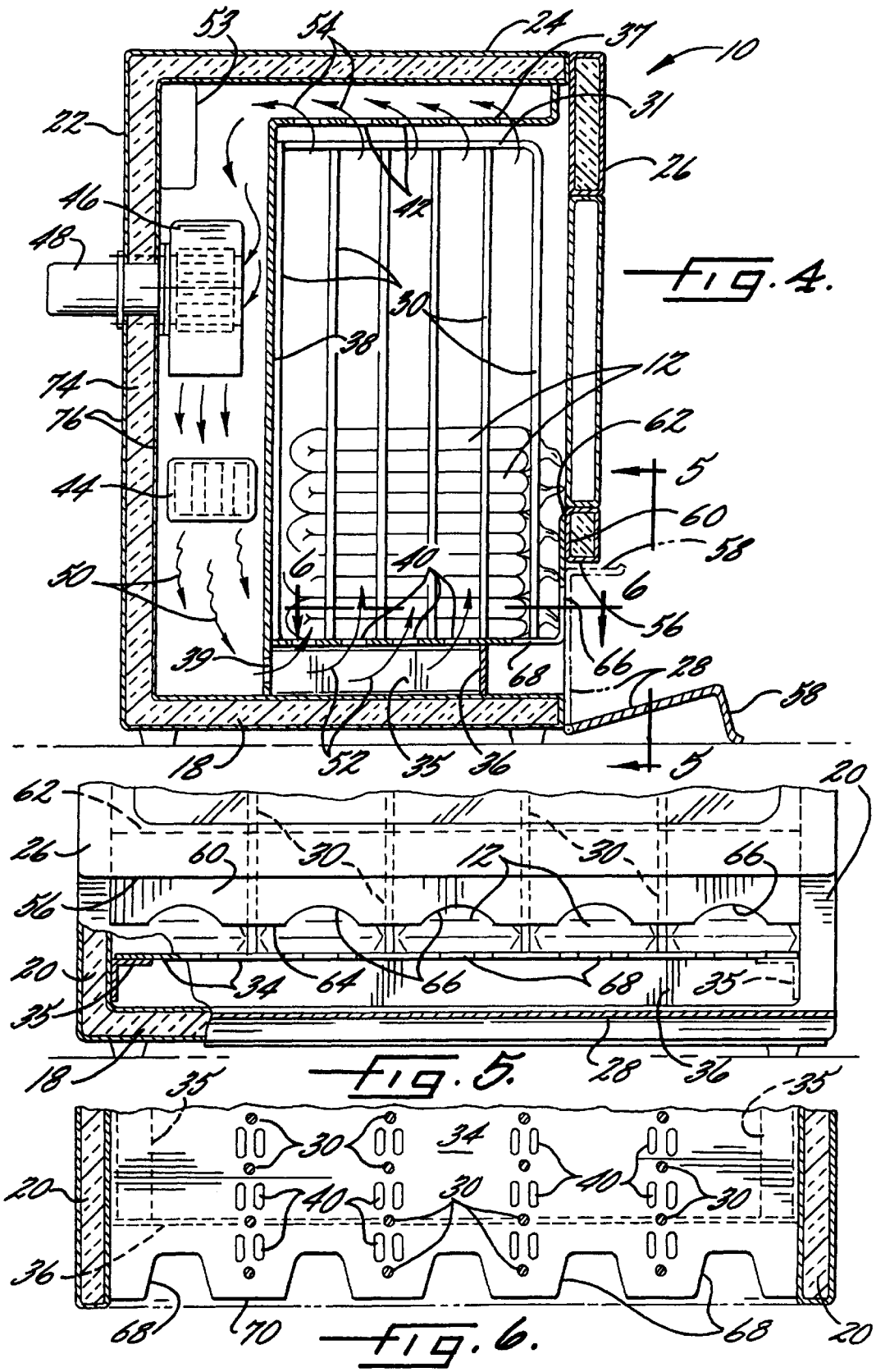

CONVECTIVE WARMER FOR FOAM PACKAGING BAGS

FIELD OF THE INVENTION

The present invention relates to a convective warmer for articles and, more particularly, to a convective warmer for flexible plastic bags which contain foam-producing precursor chemicals.

BACKGROUND OF THE INVENTION

Foam-in-place packaging is a known technique for producing cushioning packaging for fragile articles which are to be shipped. Foam-in-place packaging comprises generating foam cushioning on an as-needed basis while the article to be protected is being packaged. In general, foam-in-place packaging employs foamable compositions which are produced by bringing together two or more precursor chemicals that react and form foam when mixed together. The chemicals are generally selected from among those chemicals which when mixed form polymeric foams that harden upon curing. For example, a liquid polyol-containing precursor and a liquid isocyanate-containing precursor may be mixed and reacted to form a polyurethane foam. The resulting foam occupies a volume which is many times the volume of the liquid precursors.

One technique for foam-in-place packaging is to place the article to be packaged in a container, and then to place one or more flexible plastic bags containing a foamable composition into the container. The foamable composition expands to cause the bag to fill the void space between the walls of the container and the article, and then hardens. The result is a foam cushion that conforms closely to the shape of the article and the container, and thereby cushions and protects the article. This technique is referred to herein as the foam-in-bag technique.

A number of automated devices have been developed for rapidly making a relatively large number of bags for foam-in-bag packaging, and are assigned to the assignee of the present application. Exemplary devices are described and claimed in U.S. Pat. Nos. 4,674,268; 4,800,708; 4,854,109; and 5,376,219. Because these devices mix the precursors together as they are placed in the bags, the resulting bags must be placed in the containers with the articles immediately. Accordingly, these devices are particularly suitable for use in situations where it is desirable and feasible to make the bags containing the foam precursors at the location where articles are being packaged.

However, in certain applications, it may not be desirable to employ such automated devices to make foam-in-bag packaging directly at the packaging location. Accordingly, the assignee of the present application has developed a bag for foam-in-bag packaging use in which the precursor chemicals are contained in a bag and kept separated from one another until it is desired to form a foam cushion from the bag. At that time, the bag may be manipulated to cause breakage of a frangible membrane that separates the two precursors and to mix the precursors together. The bag is then placed into the packaging container adjacent the article to be protected. The precursors react to form foam, and the bag expands to fill the void space and cures to form a cushion. The bag is described and claimed in co-pending U.S. patent application Ser. No. 09/042,444 entitled "Foam In Bag Packaging System and Method for Producing the Same" and filed concurrently herewith, which is assigned to the assignee of the present application, and the disclosure of which is incorporated herein by reference.

It will be appreciated that the volume of foam produced in the bag is influenced by a number of parameters, including the masses of the two precursors, the ratio of the masses, and the temperature of the precursors. Additionally, the speed of the foam-forming reaction depends on the temperature of the precursors, generally increasing with increasing temperature. The masses of the precursors and their ratio can be accurately controlled in manufacturing the bag. However, the temperature of the precursors is influenced by the environment in which the bags are kept prior to use. It will be appreciated that without some means of controlling the temperature of the bags, variability in temperature will occur and result in inconsistent foam expansion from one application to another, with resultant inconsistency in packaging characteristics.

SUMMARY OF THE INVENTION

The present invention was developed to overcome the problem of temperature variability in foam-in-bag packaging bags of the type described in the aforementioned Application Ser. No. 09/042,444. The invention comprises a convective warmer configured to receive a plurality of bags in their unexpanded state prior to the precursors being brought together. The warmer circulates heated air around the bags to elevate their temperature above normal room temperature and then maintain the temperature substantially constant at a predetermined elevated temperature. The bags are used after they have reached the predetermined temperature, thus helping to assure consistent foam expansion from one bag to another and from one packaging application to another.

More particularly, the warmer includes an outer housing and an inner enclosure supported within the outer housing. The inner enclosure includes foraminous vertical dividers defining a plurality of vertical compartments for containing stacks of bags, and further includes foraminous floor and ceiling plates bounding lower and upper ends of the compartments, respectively. The inner enclosure is arranged within the outer housing such that an air space exists between the outer housing and the inner enclosure, and a forced-air heater is arranged to heat air within the air space and circulate the heated air in a closed loop from the air space through the foraminous floor plate into the compartments and out from the compartments through the foraminous ceiling plate back into the air space.

The warmer further includes doors for closing the housing to substantially seal the heated air inside the warmer and for providing access to the compartments. In a preferred embodiment, the warmer includes a loading door attached to the outer housing and openable to provide access to upper portions of the compartments for loading bags therein, the loading door having a lower edge spaced vertically above the floor plate when the loading door is closed such that at least the bottommost bag in each compartment is not covered by the loading door. The warmer also includes a dispensing door attached to the outer housing and having a top edge adjacent the lower edge of the loading door when both doors are closed, the dispensing door being openable to provide access to at least the bottommost bag in each compartment. Advantageously, the loading and dispensing doors are hingedly attached to the outer housing, with the loading door being hinged thereto along a vertical side edge of the loading door and the dispensing door being hinged to the outer housing along a horizontal lower edge of the dispensing door.

The arrangement of the loading and dispensing doors facilitates first in-first out warming of bags, since the topmost bag in a stack of bags is inaccessible when the loading door is closed, and the bottommost bag in a stack is accessible by opening the dispensing door without the necessity of opening the loading door. Further, the dispensing door can be made significantly smaller than the loading door inasmuch as the dispensing door need provide access to only a small portion of the total compartment height, whereas the loading door advantageously provides access to a majority of the compartment height to facilitate loading of bags at various heights in the compartments. Accordingly, bags can be removed via the dispensing door without creating a large opening in the housing which could allow excessive escape of heated air therefrom. Upon removal of a bottommost bag from a stack, the remaining bags in the stack slide downward under the influence of gravity to position a new bag in the bottommost position for subsequent removal.

In a preferred embodiment of a warmer in accordance with the invention, a dispensing opening for each compartment is defined between the floor plate which supports the stacks of bags and a dispensing plate which is mounted to the housing adjacent the lower edge of the loading door and adjacent a front edge of the floor plate. The dispenser plate includes a plurality of cutouts at a lower edge thereof and aligned with the vertical compartments for facilitating access to the bottommost bag in each of the compartments. The floor plate advantageously also includes a plurality of cutouts at the front edge thereof and aligned with the compartments for facilitating grasping a front portion of the bottommost bag in each of the compartments.

BRIEF DESCRIPTION OF THE DRAWINGS

Additional objects, features, and advantages of the invention will become apparent from the following description of particular embodiments thereof, taken in conjunction with the accompanying drawings in which:

FIG. 4 is a cross-sectional view taken on line 4—4 of FIG. 2;

FIG. 5 is a cross-sectional view taken on line 5—5 of FIG. 4; and

FIG. 6 is a cross-sectional view taken on line 6—6 of FIG. 4.

DETAILED DESCRIPTION OF THE DRAWINGS

Figure 1:
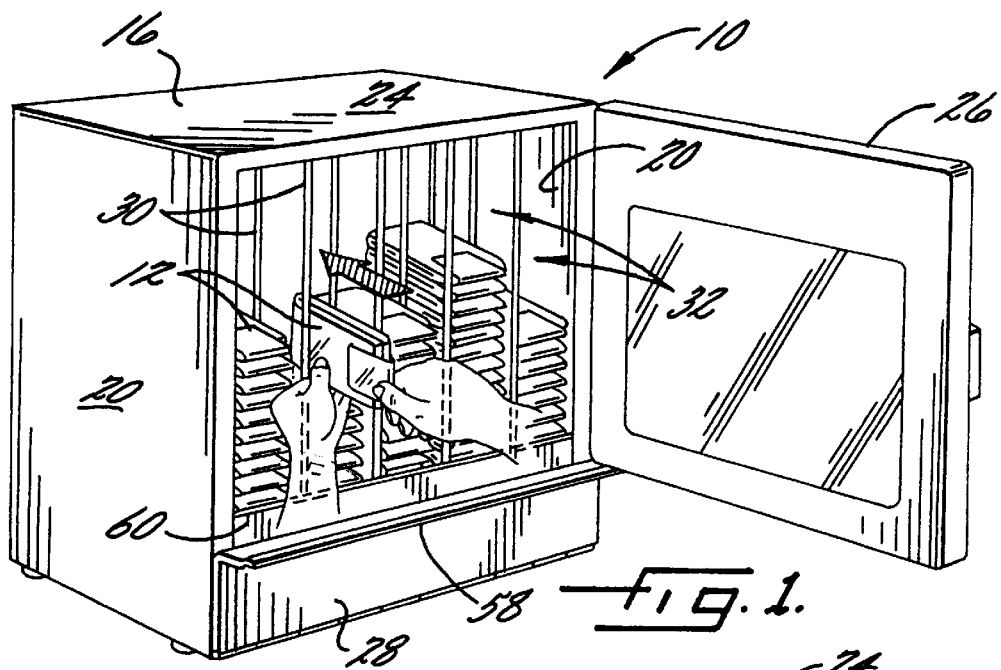
FIG. 1 is a perspective view of a warmer in accordance with the present invention showing the warmer being loaded with a supply of bags.
Figure 2:
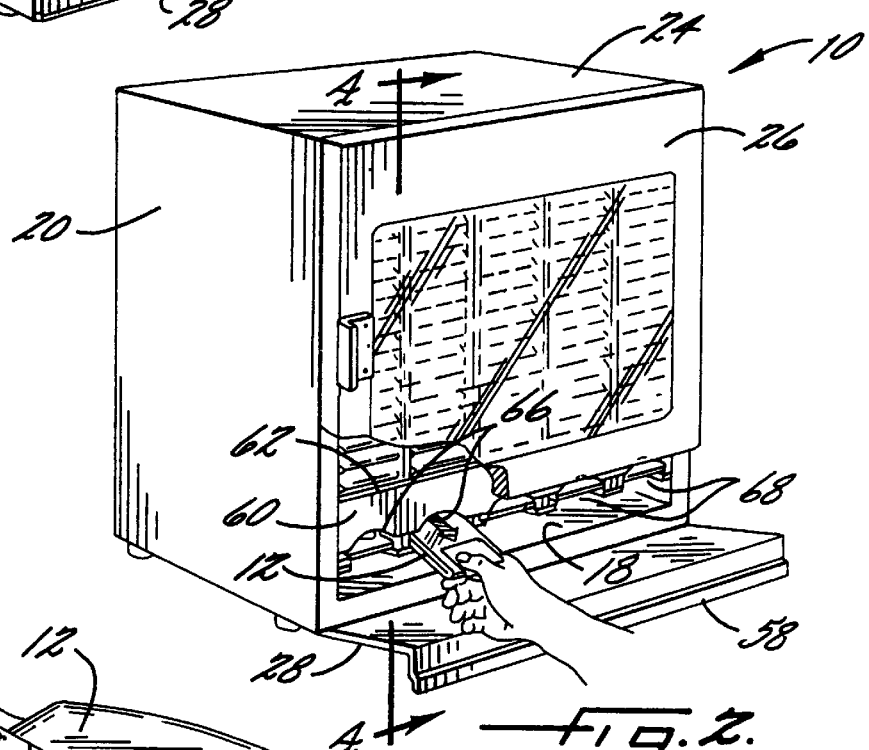
FIG. 2 is a view similar to FIG. 1 showing a bag being removed from the warmer.
Figure 3:
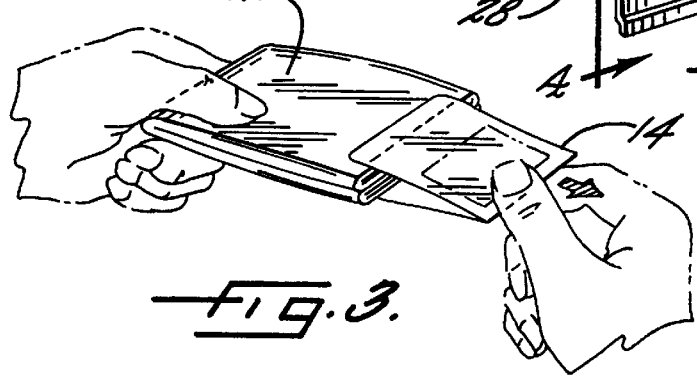
FIG. 3 is perspective view of one of the bags, showing a user grasping the bag in preparation for using the bag to form a cushion.

With reference to FIGS. 1 and 2, a warmer in accordance with the invention is broadly indicated by the reference numeral 10. The warmer 10 is provided for warming a plurality of bags 12 of the type described in the aforementioned U.S. patent application Ser. No. 09/042,444, containing precursor chemicals for creating a foamable composition. The bags 12 contain an outer "mother" bag and inner pouches which are disposed within the mother bag and which contain two precursor chemicals. The pouches keep the two precursors separate until the bag is manipulated to break a frangible seal between the two pouches and permit the two chemicals to mix and initiate a foam-forming reaction. As shown in FIG. 3, each bag 12 is folded so that there are two free ends which are brought adjacent to each other and held together by an adhesive label 14. The label 14, in addition to keeping the bag 12 in the folded condition, also facilitates grasping of the bag for removing the bag 12 from the warmer, as further described below, and also may contain indicia relating information about the bag, instructions for its use, and the like.

With particular reference to FIGS. 1, 2 and 4, the warmer 10 includes a cabinet or outer housing 16 defined by a bottom wall 18, a pair of opposite side walls 20 upstanding from opposite side edges of the bottom wall 18, a rear wall 22 upstanding from the rear edge of the bottom wall 18 and extending between rear edges of the side walls 20, and a top wall 24 attached to upper edges of the rear and side walls. The front side of the outer housing 16 includes a loading door 26 and a dispensing door 28 attached to the housing, for closing the outer housing 16 and for providing access to upper and lower portions of the internal cavity defined within the housing 16.

The warmer 10 includes vertical dividers 30 which define a plurality of vertical compartments 32 within the housing 16 for containing stacks of bags 12. Advantageously, the dividers 30 comprise rods which are arranged in a plurality of straight rows, each row including a plurality of rods 30 spaced apart along the depth direction of the housing 16 (i.e., the direction from front to rear of the housing 16). The rows of rods 30 are evenly spaced apart along the width direction of the housing 16 (i.e., the direction from one side wall 20 to the other side wall 20). This construction of the vertical dividers 30 facilitates free flow of air within and between the various compartments 32, thereby helping assure uniform heating of the bags 12, as further explained below.

The upper ends of the rods 30 in each row are attached to a horizontal cross member 31, which advantageously comprises an integral extension of the forwardmost rod 30 bent into a horizontal position.

The vertical compartments 32 are further defined by a floor plate 34 which supports the stacks of bags 12, and a ceiling plate 37 which bounds the upper ends of the compartments 32. The rods 30 are connected to the floor plate 34 and extend upwardly toward the ceiling plate 37. Additionally, a rear divider 38 comprising a generally vertical plate is supported adjacent the rear edges of the floor and ceiling plates to serve as a dam or guide for air flow within the housing 16, as further described below. Thus, an inner enclosure is formed by the floor plate 34, rear divider 38, and ceiling plate 37. The inner enclosure is subdivided into the vertical compartments 32 by the dividers 30.

The inner enclosure is supported in the outer housing 16 such that an air space exists between the outer housing 16 and the inner enclosure. More particularly, as shown in FIGS. 4–6, the floor plate 34 is vertically spaced above the bottom wall 18 of the housing 16 and rests upon feet 35 supported on the bottom wall 18 adjacent each side wall 20, and upon a transverse plate 36 which extends upward from the bottom wall 18. The transverse plate 36 forms a forward boundary of the air space between the floor plate 34 and the bottom wall 18. The ceiling plate 37 is vertically spaced below the top wall 24 of the housing 16 and is attached thereto, and the rear divider 38 is spaced from the rear wall 22 of the housing 16. The floor plate 34 includes openings 40 for the passage of air therethrough, and the ceiling plate 37 likewise includes openings 42 for air passage therethrough. The rear divider 38 extends downward to the bottom wall 18, and includes openings 39 to permit air flow into the space between the floor plate 34 and the bottom wall 18.

A heating element 44 is disposed in the air space between the rear wall 22 and the rear divider 38. The heating element 44 advantageously comprises a finned strip heater having a maximum power consumption of about 750 watts, although other types and capacities of heating elements may be used depending on the total bag capacity of the warmer 10 as well as other factors. A blower 46 is disposed in the space between the rear wall 22 and rear divider 38 vertically above the heating element 44, and is driven by a motor 48 which may be located either outside the housing 16 as shown in FIG. 4, or alternatively inside the housing 16. The blower 46 advantageously comprises a centrifugal blower having an air flow rate of about 180 cubic feet per minute, although other types and capacities of blowers may be used. The blower 46 is configured to circulate air downwardly over the heating element 44 as indicated by arrows 50. The rear divider 38 guides the air flow generally downward toward the bottom wall 18 of the housing 16, although the rear divider 38 may include openings (not shown) along a portion of its height adjacent the floor plate 34 to permit some air flow through the rear divider 38 before reaching the space adjacent the bottom wall 18. The remainder of the air flowing over the heating element 44 is forced upwardly through the openings 40 in the floor plate 34 and into the vertical compartments 32 as indicated by arrows 52, where the air is free to circulate around the bags 12 and between compartments 32, so that uniform heating of the bags is promoted.

After flowing over the bags 12 and exchanging heat with the bags, the air exits the compartments 32 through the openings 42 in the ceiling plate 37 as indicated by arrows 54, and then returns to the blower 46. Thus, a closed-loop, forced-air heating circuit is provided for forced-convective heating of the bags 12. Operation of the heating element 44 and blower 46 is controlled by a temperature controller 53 including a thermocouple (not shown) to maintain a predetermined desired temperature within the warmer 10. The warmer advantageously also includes a safety shutoff device (not shown) which automatically shuts off the heater 44 and blower 46 if the temperature within the warmer exceeds a predetermined upper limit, such as about 160° F.

The warmer 10 includes features for encouraging and facilitating first in-first out use of warmed bags. As shown in FIG. 1, the loading door 26 is hingedly attached to the housing 16 along a vertical side edge of the loading door 26. When the loading door 26 is open, access is provided to a majority of the height of the compartments 32. Bags 12 are stacked one atop the other in the compartments 32 with the labels 14 directed toward the front of the warmer 10. When the desired number of bags have been loaded into the warmer 10, the loading door 26 is closed. The lower edge 56 of the loading door 26 is spaced vertically above the floor plate 34 (FIG. 5) so that the loading door 26 does not cover the bottommost bag 12 in a stack of bags.

The dispensing door 28 is hingedly attached to the housing 16 along a horizontal lower edge of the dispensing door. When the loading and dispensing doors are both closed, the upper edge 58 of the dispensing door 28 is adjacent the lower edge 56 of the loading door 26 so that, together, the doors 26 and 28 substantially seal the housing 16 to prevent significant escape of heated air therefrom. When a bottommost bag in a stack of bags has reached a usable temperature, which may be determined based on a predetermined elapsed time that the bag has been in the warmer 10, the dispensing door 28 is opened as shown in FIGS. 2 and 5 to gain access to the bottommost bag, and the user grasps the bottommost bag and pulls outwardly to remove the bag from the bottom of the stack as shown in FIG. 2. The remaining bags slide downward under the influence of gravity until the new bottommost bag comes to rest against the floor plate 34. Thus, the first bag to be placed in any given compartment 32 is the first bag that will be removed from that compartment through the dispensing door 28.

The warmer 10 includes other features which aid in encouraging removal of bags through the dispensing door 28 rather than through the loading door 26, and which facilitate grasping of a bottommost bag for removing the bag. Specifically, the warmer includes a dispensing plate 60 which is attached to the housing 16 and extends along the width thereof adjacent the lower edge 56 of the loading door 26. The upper edge 62 of the dispensing plate 60 is vertically spaced above the lower edge 56 of the loading door 26 so that there is some overlap between the loading door 26 and the dispensing plate 60, and the lower edge 64 of the dispensing plate 60 is vertically spaced below the upper edge 58 of the dispensing door 28 so that there is some overlap between the dispensing door 28 and the dispensing plate 60. The dispensing plate 60 substantially prevents access to the bottommost bag in a stack unless the dispensing door 28 is open.

The dispensing plate 60 includes cutouts 66 adjacent the lower edge 64 and aligned with the compartments 32 to facilitate grasping the bottommost bag in a stack, as shown in FIG. 2. Additionally, the floor plate 34 includes cutouts 68 adjacent its front edge 70 which facilitate grasping the front portion of the bottommost bag. Together, the dispensing plate 60 and floor plate 34 define a dispensing opening 72 (FIG. 2) for each of the compartments 32.

The housing 16 advantageously is constructed of insulated walls comprising a thermally insulating material 74 covered by two outer skins 76. However, other constructions of the housing 16 may be employed. In use, bags may be loaded into the warmer when the warmer is either in a "cold" condition (i.e., at about room temperature) or a "preheated" condition (i.e., above room temperature, such as when the warmer has previously been used to warm a prior batch of bags). When the warmer is being used continuously to warm multiple batches of bags, the warmer may be left on continuously and warm bags may be removed from the warmer as needed and cold bags may be inserted as required to maintain an adequate supply of warm bags at all times, within the constraints imposed by the capacity of the warmer. The desired number of bags to be warmed are stacked into the compartments 32. The warmer is turned on (or left on, as the case may be), and the bags are left in the warmer for a sufficient time to insure that they reach the desired temperature, such as about 130° F., or at least until they reach a usable temperature, such as about 120° F. When a bag which has reached a usable or desired temperature is to be used, the user removes the bag from the warmer as shown in FIG. 2 and grasps the bag as shown in FIG. 3. The user then removes the flexible label 14 which among other things serves to hold the free ends of the folded bag together to prevent the bag from being unfolded, and unfolds the bag into a flat configuration. The bag is then manipulated to cause mixing of the two precursor chemicals contained within the bag in order to initiate a foam-forming reaction in the bag. The bag 12 and its use are fully described in the aforementioned U.S. patent application Ser. No. 09/042,444.

While the invention has been explained by reference to particular embodiments thereof, and while these embodiments have been described in considerable detail, the invention is not limited to the particular details of these embodiments. Modifications which are within the scope of the invention will readily occur to those of ordinary skill in the art. For example, while the vertical dividers 30 have been illustrated and described as comprising rods, any type of foraminous divider permitting air to flow freely through it may be used. Other modifications may also be made without departing from the scope of the invention. Accordingly, the scope of the invention including such modifications is to be determined by reference to the appended claims.

What is claimed is:

1. A warmer for bags containing components of a foamable composition, and comprising:
    a housing defining an internal cavity therein;
    a plurality of vertical compartments supported within the internal cavity and adapted for receiving vertical stacks of bags, the compartments including openings which vent the compartments to the internal cavity;
    a forced-air heater arranged to heat air within the internal cavity and circulate the heated air through the openings into the compartments;
    a loading door attached to the housing adjacent to and openable to provide access to upper portions of the compartments for loading bags therein, the loading door having a lower edge disposed such that at least the bottommost bag in each compartment is not covered by the loading door; and
    a dispensing door attached to the housing and having a top edge adjacent the lower edge of the loading door when both doors are closed, the dispensing door being adjacent to and being openable to provide access to at least the bottommost bag in each compartment.

2. The warmer of claim 1 wherein the loading door is hingedly attached to the housing along a vertical side edge of the loading door, and the dispensing door is hingedly attached to the housing along a horizontal lower edge of the dispensing door.

3. The warmer of claim 1, further comprising a floor plate forming a bottom of the compartments and a dispenser plate mounted to the housing adjacent the lower edge of the loading door and adjacent a front edge of the floor plate, the dispenser plate and floor plate together defining a dispenser opening for bags in each of the vertical compartments.

4. The warmer of claim 3 wherein the dispenser plate includes a plurality of cutouts at a lower edge thereof and aligned with the vertical compartments for facilitating grasping of a bag adjacent the bottom of the stack in each of the compartments.

5. The warmer of claim 3 wherein the floor plate includes a plurality of cutouts at the front edge thereof and aligned with the compartments for facilitating grasping of a bag adjacent the bottom of the stack in each of the compartments.

6. The warmer of claim 1, further comprising an inner enclosure supported within the housing, the inner enclosure including vertical dividers which partition the inner enclosure into the vertical compartments.

7. The warmer of claim 6 wherein the vertical dividers are foraminous for permitting air flow therethrough.

8. The warmer of claim 7, the inner enclosure further including a foraminous floor plate bounding the lower ends of the compartments, the inner enclosure being arranged within the outer housing such that an air space exists between the outer housing and the inner enclosure.

9. The warmer of claim 7 wherein the vertical dividers comprise spaced-apart rods.

10. The warmer of claim 1 wherein the loading door includes a transparent portion for viewing bags in the compartments when the loading door is closed.

11. A warmer for bags containing components of a foamable composition, and comprising:
    a housing defining an internal cavity therein;
    a heater for heating air and circulating the heated air through the internal cavity;
    a plurality of vertical dividers arranged in the housing and dividing the internal cavity into a plurality of compartments for receiving vertical stacks of bags, the compartments being vented to the internal cavity;
    a loading door attached to the housing adjacent to and openable to provide access to upper portions of the compartments for loading bags therein, the loading door having a lower edge disposed such that at least the bottommost bag in each compartment is not covered by the loading door; and
    a dispensing door hingedly attached to the housing adjacent to and openable to provide access to at least the bottommost bag in each compartment, the dispensing door having a top edge adjacent the lower edge of the loading door when both doors are closed.

12. The warmer of claim 11, wherein the loading door is hingedly attached to the housing and openable to provide access to the internal cavity for loading bags into the vertical compartments.

13. The warmer of claim 12 wherein the loading door and the dispensing door are openable independently of each other.

14. The warmer of claim 12 wherein the loading door includes a transparent portion for viewing bags in the compartments when the loading door is closed.

15. The warmer of claim 12, further comprising a floor for supporting the vertical stacks of bags.

16. The warmer of claim 15 further comprising a dispenser plate mounted to the housing adjacent the lower edge of the loading door and adjacent a front edge of the floor, the dispenser plate and floor together defining a dispenser opening for a bag adjacent the bottom of the stack in each of the vertical compartments.

17. The warmer of claim 16 wherein the dispenser plate includes a plurality of cutouts at a lower edge thereof and aligned with the vertical compartments for facilitating grasping of a bag in each of the compartments.

18. The warmer of claim 16 wherein the floor includes a plurality of cutouts at the front edge thereof and aligned with the compartments for facilitating grasping of a bag in each of the compartments.

19. The warmer of claim 15 wherein the floor is vertically spaced above a bottom wall of the housing and includes openings for the passage of air therethrough.

20. The warmer of claim 19 wherein the heater includes a heating element for heating air and a blower for circulating the heated air through the internal cavity of the warmer.

21. The warmer of claim 20 wherein upper ends of the compartments are bounded by a generally planar ceiling which is generally parallel to the floor, and wherein the vertical compartments are bounded on one side by a rear divider which is generally normal to the floor and the ceiling, the ceiling including openings for the passage of air therethrough, and the heating element and blower being adapted to circulate heated air upward through the openings in the floor into the compartments and out the openings in the ceiling.

22. The warmer of claim 21 wherein the heating element and blower are located between a rear wall of the housing and the rear divider which is spaced from the rear wall.

23. The warmer of claim 21 wherein the ceiling is spaced from a top wall of the housing to define a channel therebetween for the passage of air.

24. A method of warming bags containing components of a foamable composition, the method facilitating the use of warmed bags on a first in-first out basis, the method comprising:

loading a plurality of bags into a generally vertical compartment of a warming device with the bags stacked one upon the other, the warming device including a housing which contains the compartment and further including a heater for heating air within the housing and a blower for circulating the heated air within the housing, the compartment including foraminous portions permitting heated air to circulate through the compartment;

closing an upper portion of the compartment by a loading door after the bags have been loaded into the compartment;

closing a lower portion of the compartment by a dispensing door such that the housing is substantially sealed;

allowing a bag adjacent the dispensing door to remain in the warming device with the loading and dispensing doors closed until said bag reaches a usable temperature; and opening the dispensing door and removing said bag from the compartment, the remaining bags in the compartment sliding downward under the influence of gravity to position a new bag in the position previously occupied by the removed bag.

* * * * *